United States Patent [19]  [11] Patent Number: 5,173,274
Owen  [45] Date of Patent: Dec. 22, 1992

[54] FLASH LIQUID AEROSOL PRODUCTION METHOD AND APPARTUS

[75] Inventor: Thomas E. Owen, Helotes, Tex.

[73] Assignee: Southwest Research Institute, San Antonio, Tex.

[21] Appl. No.: 746,772

[22] Filed: Aug. 16, 1991

[51] Int. Cl.$^5$ .............. A61L 9/00; B01J 7/00
[52] U.S. Cl. ............... 422/306; 252/305; 239/102.2; 239/3; 361/78.2; 361/DIG. 48
[58] Field of Search ............ 252/305; 239/102.2, 239/3; 261/78.2, DIG. 48, 81; 55/257.1, 103; 361/228; 422/306

[56] References Cited

U.S. PATENT DOCUMENTS

| | | | |
|---|---|---|---|
| 3,352,950 | 11/1967 | Helton et al. | 264/0.5 |
| 3,463,842 | 8/1969 | Flack et al. | 264/0.5 |
| 3,790,079 | 2/1974 | Berglund et al. | 239/3 |
| 3,804,329 | 4/1974 | Martner | 239/102 |
| 3,986,669 | 10/1976 | Martner | 239/102 |
| 4,533,082 | 8/1985 | Maehara et al. | 239/102 |
| 4,541,564 | 9/1985 | Berger et al. | 239/102 |
| 4,582,654 | 4/1986 | Karnicky et al. | 261/81 |
| 4,656,963 | 4/1987 | Yonehara et al. | 118/316 |
| 4,671,906 | 6/1987 | Yasue et al. | 264/9 |
| 4,795,330 | 1/1989 | Noakes et al. | 425/6 |
| 4,801,411 | 1/1989 | Wellinghoff et al. | 264/7 |
| 4,871,489 | 10/1989 | Ketcham | 264/9 |
| 4,966,737 | 10/1990 | Werner et al. | 264/14 |
| 5,021,701 | 6/1991 | Takahashi et al. | 310/345 |
| 5,053,100 | 10/1991 | Hayes et al. | 156/194 |

Primary Examiner—Richard D. Lovering
Assistant Examiner—N. Bhat
Attorney, Agent, or Firm—Jones, Day, Reavis & Pogue

[57] ABSTRACT

Method and apparatus are presented for producing liquid aerosol particles of narrow size distribution by dispersing one or more droplet columns and impinging these droplets onto a vibrating cavitation surface to create a high density fountain of aerosol particles. Flash cavitation of these impinging droplets is achieved through controlled disruption on impact of the impinging liquid droplets with a vibrating surface wherein the measured size and frequency of droplets promote complete disruption of the droplets into aerosol particles with substantially no splash disruption or agglomeration thus efficiently producing small liquid aerosol particles having a narrow size dispersion range.

17 Claims, 2 Drawing Sheets

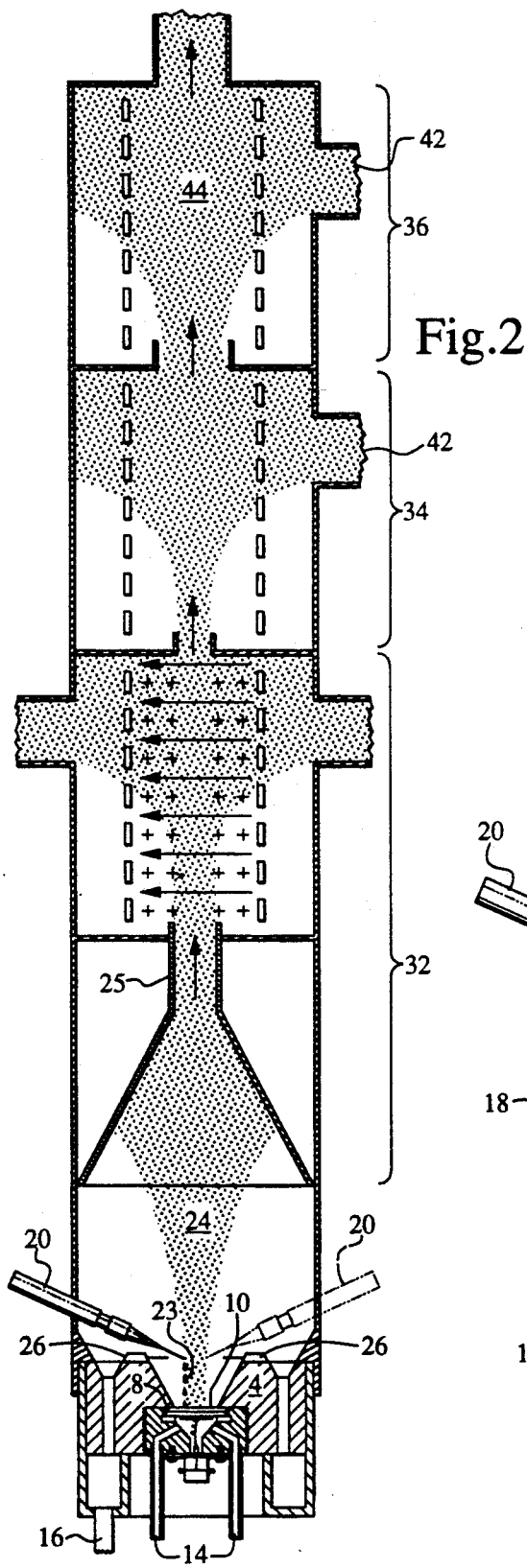
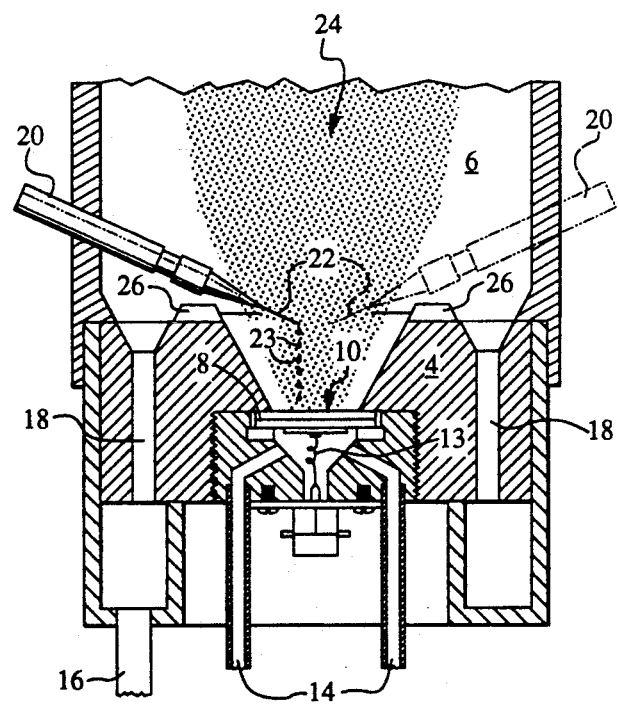
Fig.2
Fig.1

FLASH LIQUID AEROSOL PRODUCTION METHOD AND APPARTUS

BACKGROUND OF THE INVENTION

This invention relates to the production of liquid aerosol particles having narrow size distribution. Particularly, this invention relates to methods and apparatus for the production of aerosol particles resulting from a liquid droplet feed source. In another aspect, this invention relates to methods and apparatus for dispersing a multiplicity of droplet columns by impinging these droplets onto a vibrating surface to create a high density fountain of aerosol particles.

Liquid aerosol particle materials have diverse applications such as creating mists and fogs, and specific particulate compositions and sizes, painting and coating, humidifying air, administering medicinal drug compounds by nasal inhalation, facilitating chemical reactions, and creating monodispersed ceramic particles from precursor organic metallic liquid. Aerosol standards, consisting of monodispersed aerosols of a high degree of monodispersity and accurately known particle size are needed for a variety of purposes ranging from fundamental aerosol research to chemical reactive applications as well as coatings and the like. To be generally useful, the aerosol production must be sufficiently flexible to permit aerosols to be generated from a variety of solid and liquid materials having desired physical properties.

Chemical reactions involving small liquid aerosol droplets provide a basis for producing particulate products in the form of small size solid particles. Such small aerosols also offer a large surface area to the carrier gas in which they are suspended or transported, hence are advantageous in promoting liquid gas chemical reactions or liquid droplet evaporation.

Conventional monodispersed aerosol generators such as the spinning-disk aerosol generator, the atomizer-impactor generator, the condensation generator, vibrating orifice aerosol generators all have severe limitations for use as a basic aerosol control particle size generator. The spinning-disk generator, while flexible in terms of aerosol material, can produce aerosols with geometrical standard deviations of not better than 1.07 or a standard deviation of approximately 7% of the mean particle size. The spinning-disk generator is also a relatively complex piece of apparatus.

Another conventional method for producing small liquid aerosol particles is by means of ultrasonic excitation in a manner to produce mechanical disruption of a bulk source liquid through the physical process of cavitation. Cavitation in liquids can cause aerosol droplets to be ejected from the liquid surface to become suspended in a surrounding carrier gas or atmosphere. This technique has been reported and used previously to generate liquid droplets in a size and range of 1 to 3 micrometers for applications where high-density concentrations of liquid aerosols are required. A particular reference to this technique is provided in a paper entitled "An Improved Ultrasonic Nebulizer System For The Generation of High Density Aerosol Dispersion" by M. B. Denton and D. B. Schwartz published in *Review of Science Inst.*, Vol. 45, Pages 81 through 87, January, 1974. For the particle size range size set out above, the ultrasonic cavitation frequency must be approximately 3 MHz and, using a piezoceramic drive element, the excitation power required to produce cavitation is approximately 100 watts. When a chemical substance or solution is diluted in a solvent and subject to cavitation, aerosol products are produced. The solvent will evaporate from each particle to produce a residual particle whose diameter is reduced from the original aerosol particle diameter by the cube root of the volume concentration of the chemical dilutant. Thus, for example, by using a source liquid solution whose solid precipitate components are diluted in the range of 100 to 1 to 1,000 to 1 by the volatile solvent, the resulting solid particles after solvent evaporation will be in the range from 1/5 to 1/10 the diameter of the original liquid aerosol droplet.

A method of preparing a fine-particle oxide salt from oxculates, acitates, and carbonates is to thermally decompose, pyrolyze, or hydrolyze them to their respective oxides. Current results obtained using the controlled hydrolysis method are the most successful to date in producing accurately sized particles having spheroidal shape and a diameter of approximately 200 nanometers agglomeration of particle.

Size dispersion of particles no better than plus or minus 10% can be produced by either: (1) precipitation of supersaturated solutions of an appropriate water reactive metal alkoxide or (2) preparation of a monodispersed aerosol by condensation of a super saturated atmosphere of organometallic vapor in a flowing gas stream. Upon dispersal in water to form a colloidal suspension, only disordered colloids, which have a tendency to aggregate upon removal of the suspending solvent phase during slip casting, will be present. These powders still exhibit significant agglomeration to induce occasional preferential sintering defects in the finished microstructure of the ceramic, resulting in local variations in density and potential stress concentration centers.

Furthermore, many of the newest and most promising ceramics such as silicone nitride are not processable by controlled hydrolysis of alkoxide solutions. For these ceramics, other methods of particle formation are required.

One liquid aerosol production method and apparatus particularly adapted for producing mono-size ceramic particles is found in the teachings of U.S. Pat. No. 4,801,411, Wellinghoff, et al., hereby incorporated by reference. The '411 patent discloses the use of ultrasonic cavitation to produce aerosol from a bulk source liquid. The basic process of aerosol production by bulk liquid cavitation is also described in the Denton & Schwartz article, "An Improved Ultrasonic Nebulizer System For The Generation Of High Density Aerosol Dispersions". These methods are effective largely because the organometallic compounds are liquid solutions in which controlled hydrolysis produces uniform microsized particle precipitation. Alternative mechanization of the alkoxide hydrolysis reaction and precipitation process, using aerosol particle formation and flow stream processing, provide a high degree of particle handling, thereby avoiding agglomeration. Production of the organometallic precursor liquids as uniform size aerosol droplets and subsequent electrostatic charging and electromagnetic separation of these particles assures high uniform size and lack of agglomeration during subsequent reaction to form, for example, finished molding powder.

The '411 patent discloses the introduction of a bulk liquid on to a piezoelectric transducer. The mechanical resonance of the transducer causes cavitation of the bulk liquid and the release of aerosol at the liquid surface. In another embodiment, the patent provides a methodology wherein the bulk liquid is allowed to separate and form into two components before the transducer is operated. The resulting aerosol particles are comprised of one component coated by the second component liquid. Thus, the '411 patent is particularly suited to the production of two phase aerosol particles produced by cavitation of a separated and stratified bulk liquid.

Unfortunately, the teachings of the '411 patent and other publications do not completely transfer all of the bulk liquid into aerosol form. Small quantities of aerosol therefore cannot be produced without significant waste. Splashing and agglomeration of the bulk liquid make it difficult to produce uniformly small aerosol particles. The efficiency of the known methods and apparatus depend upon the mass of the bulk liquid and changes in the mass as aerosol is produced, because of mass loading effects on the resonance frequency of the vibrating transducer.

Presently, source liquid is ultrasonically excited to cavitate in bulk form, causing a violent mechanical disruption of the liquid including vigorous splashing of large non-aerosol droplets. This violent disruption produces a wider range of particle sizes and may be desirable or acceptable in certain applications. However, these wide range particle size interfere with the production of uniform smaller control particle sizes. Improved methods are needed to efficiently produce small liquid aerosol particles having a narrow size dispersion range.

SUMMARY OF THE INVENTION

The invention provides an efficient method and apparatus for ultrasonic cavitation production of small-diameter liquid aerosol particles having a narrow size distribution. In accordance with the invention, a vibrating surface is supplied with a controlled liquid source in a sequence of measured droplets which impinge onto the vibrating surface. The defined process has the meaning according to this description of "flash cavitation" because each drop falling on to the vibrating surface is rapidly and completely disrupted into aerosol droplet particles of a narrow size distribution. In providing a process column or a source stream of small liquid droplets in measured size and frequency rather than a bulk volume of liquid source, a complete and controlled disruption or flash cavitation on impact of the impinging liquid droplets with an ultrasonically excited surface provides a systematically controlled conversion of the liquid drop source materials to aerosol particles. This method of cavitation has the advantage of eliminating the violent disruption and splashing of large droplets as occurs when conventional bulk excitation methodology is used. In addition, the feed source liquid droplet material is completely converted into aerosol particles which are of substantially uniform size. The methodology and apparatus requires less total ultrasonic excitation power to produce the useable aerosol particle output. This flash cavitation method and apparatus supplies aerosol particles having a consistently narrow sized distribution without causing splashing, agglomeration of particles or inadvertent liquid losses; therefore the vibrating surface can be operated at a high motional resonance and mechanical displacement to produce maximum cavitation effect in processing the source liquid droplets.

In accordance with the invention, a method is presented for generating small diameter liquid aerosol particles having a narrow size distribution as a result of impinging onto a flash cavitation surface of at least one or more columns of individual liquid droplets at a rate which promotes maximum cavitation effect in processing the source liquid droplets. Aerosol particles are then released into a carrier gas or sweep gas stream for further modification or utilization. Achievement of flash cavitation is afforded by apparatus suitable for commercial volume generation of aerosol particles which is comprised of a housing means having a flash cavitation surface exposed to an aerosol chamber. An apparatus is provided for supplying droplets to the cavitation surface under controlled release frequency with the droplet outlets being positioned above the surface inside the chamber. Means are provided for supplying the liquid droplet generating apparatus with liquid under pressure whereby the apparatus generates measured droplet column frequency. Means are also provided for operating the flash cavitation surface for producing aerosol particles having narrow size distribution and sweeping these particles into a carrier gas which flows into and through the chamber.

BRIEF DESCRIPTION OF THE DRAWINGS

FIG. 1 is cross-sectional view of one embodiment of the flash cavitation aerosol generator showing one droplet source with a second droplet source in phantom, both sources positioned above the flash cavitation, vibration surface.

FIG. 2 is a diagrammatic vertical sectional view of the ultrasonic aerosol generator in combination with expanded aerosol chamber apparatus in accordance with the invention inclusive of the flash cavitation aerosol generator of FIG. 1.

DETAILED DESCRIPTION OF THE INVENTION

Figure 3:
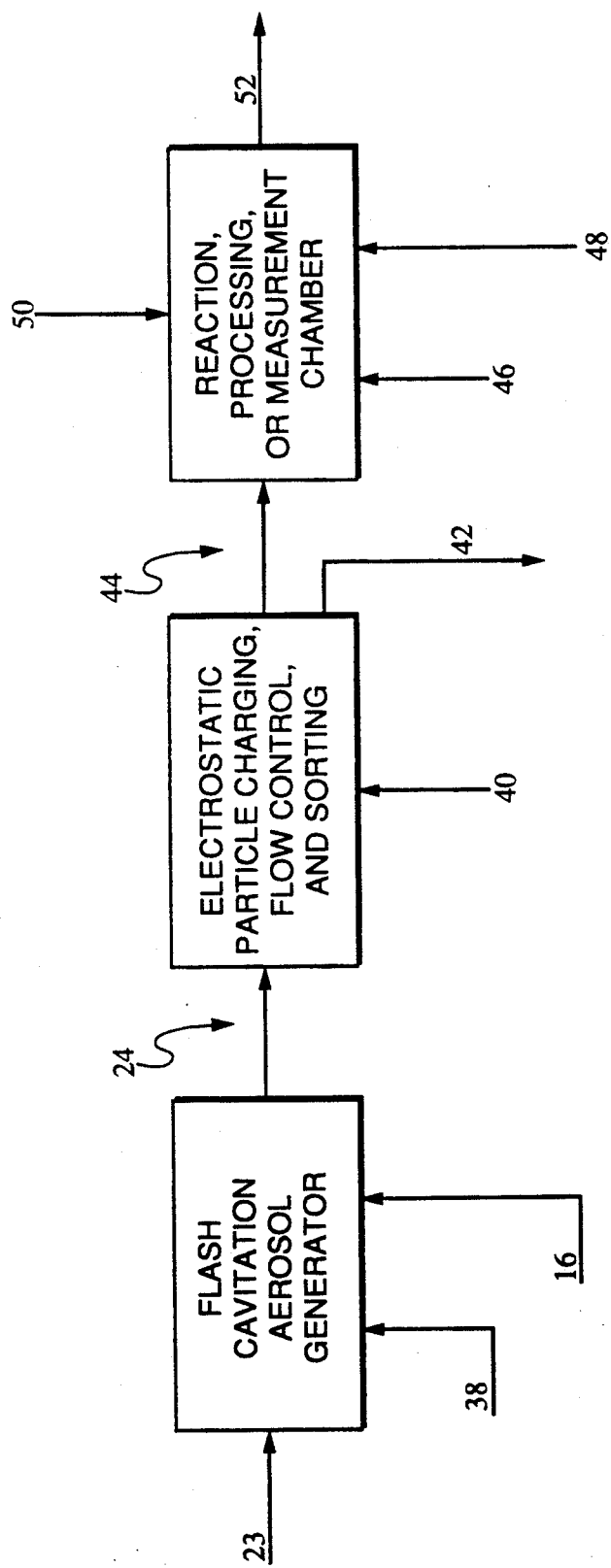
FIG. 3 is a schematic block diagram of a flow path for liquid aerosol particle generation and utilization system in accordance with the invention.

A practical embodiment of the invention is shown in FIG. 1 wherein a cross-sectional view of the flash cavitation aerosol generator 2 is provided. An ultrasonic excitation technique is used in accordance with the invention using ultrasonic cavitation, employing a piezoelectric ceramic plate bonded to a metallic or gas glass plate mounted in housing means 4 at a first end of aerosol chamber 6. An excitation element 8 provides a flash cavitation surface 10. The housing means 4 also includes excitation connector 12, contact spring 13 and coolant passage 14 for the high energy piezoelectric transducer. The vibrating surface, flash cavitation surface 10, upon which liquid droplet cavitation occurs is excited by high energy piezoelectric transducer. The transducer consists of a two layer composite piezoelectric and glass assembly often referred to as a sandwhich transducer. The piezoceramic glass components may be comprised of circular or square or rectangular plates bonded together to form a two layer assembly. The piezoceramic plate is excited at its fundamental thickness-mode mechanical resonance, the thickness dimension undergoes its maximum thickness-dimension expansion and contraction displacements which are coupled through the rigid bond interface to the glass plate. If the glass plate has a thickness dimension of one-half wavelength at the piezoceramic plate thickness-mode resonance, the glass plate serves as a low loss impedance matching layer which presents the same mechanical radiation load to the piezoceramic element as that present at the free surface of the glass plate. Thus, for a liquid droplet cavitation application, the droplets impinging on the flash cavitation surface 10 of the glass plate will experience the same or somewhat greater mechanical surface displacement than that produced by the piezoelectric plate bonded to the outside of the glass plate.

The free surface of the glass plate will move in a uniform piston like motion at the resonant frequency of the piezoceramic element and will be loaded only by air and the relatively small mass of the liquid droplets falling on its surface. This low value of mechanical load allows the piezoceramic element to produce its maximum mechanical displacement at the resonant frequency and the half wavelength glass plate will increase the sharpness of the resonance effect. The resulting increase in the displacement amplitude at the free surface of the glass will be approximately twice that of the piezoelectric element alone. The factor of 2 gain in displacement arises since the composite transducer has a total thickness of two wave lengths at the resonance frequency, i.e., the composite device consists of two close-coupled resonators. Also since the mechanical loading is small, variations in this load have a negligibly small effect on the resonant frequency, thereby eliminating the need for adjusting the excitation frequency of the driving signal applied to the transducer during cavitation process.

Housing means 4 of the flash cavitation aerosol generator 2 provides for carrier gas input openings 16 and carrier gas passages 18. Flash cavitation aerosol generator 2 is provided with a source liquid supply 20 through a liquid droplet orifice 22 resulting in a liquid droplet column 23. Liquid droplet column 23 impinges upon the flash cavitation surface 10, thus forming aerosol particles 24 which flow upwardly into the aerosol chamber 6 and are swept into the chamber by a carrier gas exiting carrier gas housing passages 18. In an exemplary operational mode, carrier gas is introduced through the carrier gas input opening 16 and through carrier gas housing passages 18 at a pressure of about 1 to 2 pounds per square inch. The gas pressure is adjusted to produce an aerosol outflow having an estimated flow velocity, for example, of one foot per second. Aerosol particles 24 may be electrically charged to improve aerosol separation, consolidation or other movement control. The aerosol particles 24 also may be channeled at an upper end of the aerosol chamber 6 as shown in FIG. 2.

In FIG. 1, the source liquid supply 20 is provided to the flash cavitation surface 10 in small droplets from a capillary nozel or liquid droplet orifice 22. Multiple liquid droplet orifices 22 can be mounted in the aerosol chamber 6 and appropriately spaced above separate sections of the flash cavitation surface 10. Source liquid supply 20 is utilized to supplement the static liquid supply pressure provided by gravity head. Periodic pressure impulses produced by such a pump promotes flow through the liquid droplet orifice 22 and causes each successive liquid supply droplet to part from the orifice tip at a consistent break-away size and at regularly controlled time intervals.

In one embodiment, the liquid supply 20 is fed through the liquid droplet orifice 22 which can be a size 27g hypodermic needle. The tip of the liquid droplet orifice 22 is sized to provide a 0.5 mm orifice such that the circumferential plane of the orifice is parallel to the flash cavitation surface 10 of excitation element 8. The source liquid supply 20 can be interrupted by an upstream control stop cock valve. Gravity alone does not always provide consistently sized and timed liquid drops thus an small aereation (not shown) pump is provided to apply air pressure pulse to the top of a liquid reservoir (not shown) in place of an in line pulsation pump. This arrangement consistently supplies liquid drops with a diameter of about 0.05 inches at a desired flow rate. As can be appreciated, various size liquid droplet orifices 22 each can be used to supply larger or smaller droplets for various applications and various materials.

In another embodiment, the flash cavitation surface 10 is circular with approximately 1 inch diameter. Obviously, other flash cavitational surface shapes and sizes may be used for different capacity and/or applications. When integrated into the housing means 4, the exposed surface of the flash cavitation surface 10 is about 0.7 inches in diameter and forms the bottom of a conically flared cavitation cup. The cavitation cup within the housing means 4 is necessary for bulk liquid cavitation; however, it is not necessary for the cavitation method of the present invention. The apparatus of the present invention could also allow placement of the transducer, i.e., the flash cavitation surface 10, in other than a cup geometrical configuration. Other modifications of the generator would allow direct exposure of the surface 10 aerosol chamber, without the intervening cup spacing thus allowing multiple liquid droplet orifices 22 producing multiple liquid droplet columns 23.

A diagrammatic vertical sectional view of the ultrasonic aerosol generating embodiment of the inventive apparatus is presented in FIG. 2 wherein the flash cavitation aerosol generator 2 of FIG. 1 is presented in a bottom portion of the apparatus shown in FIG. 2 with the aerosol chamber 6 being extended upwardly through reaction chambers 28 and aerosol treating chambers. Electrostatic corona discharge elements 26 are positioned adjacent the aerosol particles 24 and extend into the aerosol chamber 6. The monosized aerosol particles 30 flow upward through gas entrainment means or electrostatic field driving means into aerosol chamber orifice 25. Orifice 25 is part of the upper tower or chamber arrangement for particle sorting stage 32. Two stage electrostatic precipitators are positioned in the upper chamber levels 34 and 36. The two-stage electrostatic precipitator chambers 34 and 36 are provided with multiple cull particle outlets 42, thus allowing selected aerosol particles 44 to precede to the upper regions of the flash cavitation aerosol generator and separator.

A schematic block diagram of FIG. 3 provides for an alternative flowpath of the present invention for the flash cavitation aerosol generator 2 aerosol particles 24. A liquid droplet column 23 enters the generator along with a cavitation transducer power input 38 as well as a carrier gas input opening for passing gas through the generator, sweeping produced aerosol particles 24 into the aerosol chamber 6. The aerosol chamber 6 of FIG. 2 has an electrostatic particle charging flow control and sorting zone supplied with electrostatic charging or deflection potentials 40 for further separation of the desired aerosol particles 24, i.e., the selected particles 44 or culled particles 42. The selected aerosol particles 44 are introduced to reaction, processing, or measurement chamber utilization which are provided with process energy 46 or in the alternative process reagents 48 or measurement instrumentation 52. Alternatively, output aerosol product 52 is transferred to other reaction zones or coating zones and the like.

Experimental tests of flash cavitation dispersion of individual liquid droplets into small aerosol particles indicated that a liquid droplet could be dispersed at any position on the flash cavitation surface 10. One composite transducer device used was a Channel Industries, Inc. prefabricated piezoelectric ceramic disk 1.0 inch in diameter and 0.148 inch thick. The piezoceramic element was a Channel Industries Type 5800 lead zirconate titante disk 0.062 inch thick and the glass plate was a fused quartz disk 0.085 inch thick. The fundamental resonance frequency of this transducer was 1.30 MHz when driven by an RF power amplifier operating at a measured power of 20 watts (approximately 100 volts applied to transducer). Since the typical compressional wave velocities in the transducer materials are 4,100 m/s and 5,600 m/s, respectively, the half-wavelength thickness dimension of the bonded plates are confirmed to be $$\text{Piezoceramic Plate: } t_p = \frac{4,100(39.37)}{2(1.3 \times 10^6)} = 0.0621 \text{ in.}$$

$$\text{Fused Quartz Plate: } t_g = \frac{5,600(39.37)}{2(1.3 \times 10^6)} = 0.0848 \text{ in.}$$

The aerosol-generating half-power bandwidth of the resonant transducer was determined approximately by observing the aerosol production rate by visual inspection at a liquid drop supply rate of 8 drops/sec for a transducer driving power of 20 watts and then observing the aerosol production rate for a driving power of 10 watts. With the transducer driving power adjusted to 20 watts at the resonance frequency, $f_r$, of 1.3 MHz, the excitation frequency was tuned off resonance above and below 1.3 MHz until the same 10 watt half-power aerosol production was again observed. The half-power bandwidth determined by this method was 7 kHz, corresponding to a Q of $1.3 \times 10^6/7 \times 10^3 = 186$. The mechanical displacement, D, of the glass cavitation surface 10 may be estimated from the thickness piezoelectric strain constant for Type 5800 piezoceramic material ($d_{33} = 380 \times 10^{-12}$ m/v) and the Q multiplying effect that occurs at resonance. That is, for the composite transducer the peak displacement at the glass surface is approximately $$\Delta = d_{33} V t_p Q$$
$$= (380 \times 10^{-12})(39.37)(100)(0.062)(186)$$
$$= 17.3 \text{ }\mu\text{in,}$$

corresponding to a peak acceleration of $$a_{pk} = (2\pi f_r)^2 \Delta = 4\pi^2 (1.3 \times 10^6)^2 \left[ \frac{17.3 \times 10^{-6}}{39.37} \right]$$
$$= 2.98 \times 10^6 \text{ g.}$$

For liquid water droplets having an estimated diameter of about 0.050 inch, the force delivered by the vibrating surface to each droplet is, approximately $$F_{max} = P_w V_d a_{pk}$$
$$= 1,000 \left[ \frac{4\pi}{3} \right] \left[ \frac{0.05}{2} (39.37) \right]^3 (2.98 \times 10^6)$$
$$= 3.2 \text{ Newtons (0.719 lb-ft).}$$

where:
$P_w$ = density of water
$V_d$ = volume of source water droplet.

This force was observed to be more than sufficient to disintegrate the impinging droplets and to propel their derived particulates upward in a fountain of water aerosol particles. The water particles had a narrow size range of approximately 5 $\mu$m in diameter as measured by a laser optical scattering method.

The same experimental arrangement, when operating at the excitation power level of 20 watts, was estimated to be capable of dispersing a multiplicity of droplet columns impinging on the vibrating glass surface to create a higher density fountain of aerosol particles. Thus, by arranging several liquid supply nozzles or orifices to simultaneously deliver droplet columns to different locations on the vibrating, flash cavitation surface 10, the aerosol particle 24 production rate can be increased. The potential increase in aerosol production rate will be limited by the ability of the aerosol generator design to remove the particles without excessive agglomeration after formation or otherwise limited by overloading the droplet cavitation power of the vibration transducer.

The source liquid supply 20 drop rate was found to have an optimum value whereby the droplets should not be so closely spaced that cavitation disruption of the preceding droplets cannot be completed before other droplets are subject to cavitation at the same position or, the droplets should not be so widely separated that the cavitation process will not produce aerosol particles at the full capacity. The aerosol production rate may be adjusted to rates lower than the maximum by controlling the liquid droplet column 23 feed rate.

Droplet cavitation rates were tested experimentally using a source liquid drop delivery system capable of producing droplets having a nominal diameter of 0.050 inch. For a cavitation surface 10 vibrating at 1.3 MHz, the maximum rate of droplet disruption without interference was found to be about 8 drops/sec. This rate was limited by the capacity of the cavitation process to disperse each source drop into aerosols which could be lofted away from the disruption area before the next droplet entered the cavitation position. These rates were utilizing the cup apparatus of FIG. 1, thus higher rates would be possible using a flash cavitation surface 10 which is level with the floor of aerosol chamber 6 or elevated above the chamber floor.

Although several sizes of droplet supply nozzles were tested, the low-pressure gravity-feed supply system controlled by a simple flow line petcock valve was not versatile enough to produce a wide range of droplet sizes. From a practical view, however, the somewhat smaller source droplets were observed to be disintegrated more quickly and completely than the larger droplets. Tests performed using a periodic vibrating excitation applied to the droplet delivery nozzle were effective in producing a regular drop rate in comparison with the drop rate produced by gravity feed alone.

An important aspect implied by the droplet size effects is that a moving droplet delivery nozzle or a pressure-driven droplet spray supply system should be more effective than the stationary gravity feed system in producing monodispersed particles since the impinging droplets will be smaller and can be more broadly distributed over the surface of the cavitation production surface to improve efficiency.

In one embodiment, an upper end of a 4 inch diameter plexiglass chimney which defines the aerosol chamber 6 also includes, as shown in FIG. 2, an aerosol chamber orifice 25 of about 1.5 inch diameter which forms a constricted outflow for the aerosol particles 24. Carrier gas input supply pressure can be adjusted to produce an aerosol outflow having a velocity of about 1 foot per second at the aerosol chamber orifice 25. A fountain of aerosol particles 24 was then injected into a helium-neon laser beam for the purposes of measuring the aerosol particle size and particle density. Particle sizes obtained with this apparatus using liquids as presented is shown in the following table.

The table shows particle size obtained utilizing several liquids with their respective surface tensions.

TABLE

| Source Liquid (% by volume) | Particle Diameter (lm) | Surface Tension (Pa) |
| --- | --- | --- |
| Methanol | 1.3 | 3.9 |
| Acetonitrile | 1.3 | 3.9 |
| 75% Acetonitrile 25% Water | 1.5 | 4.2 |
| 50% Acetonitrile 50% Water | 2.4 | 4.4 |
| Deionized Water | 4.7 | 7.24 |

Many industrial processes require liquid materials to be dispersed in particulate forms for purposes of introducing these particles into chemical reactor systems or flow lines, creating mists, and fog atmospheres of specific particle composition and particle sizes. The production of aerosol liquid particulate sprays are used in coating processes creating humidified air, precursor organometallic liquid particles for processing into monodispersed ceramic particles, and production of narrowly-sized aerosol particles for a host of other applications including medicinal and the like.

The methodology according to the invention can be designed to operate at frequencies ranging from about 200 khz to about 10 mhz to generate monodispersed particles of relatively accurately controllable sizes. In addition, electrostatic corona charging of the liquid aerosol droplets immediately after the aerosol droplets are formed by flash cavitation, provides a means for accelerating the particles out of the vicinity of the cavitation chamber. This acceleration is achieved by means of a static electric field of appropriate polarity orientated vertically upward above the cavitation zone. Electrostatic corona charging and accelerating of the particles can be used in combination with the carrier gas which is used to entrain the aerosol particles in order to remove them from the cavitation zone. Both the electrostatic acceleration technique and the carrier gas entrainment technique provide supplemental features of aerosol particle generators and are primarily used for the purpose of removing or controlling the movement of the aerosol particles after formation. The present invention provides for a method and apparatus for flash cavitation aerosol generation and has several significant advantages in applying the cavitation process to generate liquid aerosol particles. The methodology and apparatus has the potential for expansion to large scale aerosol production and with its superior quality control of aerosol particle size distribution along with complete source liquid conversion provides a methodology of prospective commercial value as will be appreciated by those skilled in the art.

While there have been shown and described several apparatus and method embodiments for generating monodispersed aerosol particles, it is understood that the changes in the size, materials, electrical circuits, liquid and gasflow systems may be made by those skilled in the art without departing from the spirit of the invention.

What is claimed is:

1. A method for generating liquid aerosol particles having a narrow-sized distribution comprising:
    (a) forming at least one column of individual liquid droplets by forcing liquid under pressure through an orifice at a rate sufficient for forming individual droplets;
    (b) controlling droplet formation frequency and size;
    (c) impinging said droplets onto vibrating surface;
    (d) vibrating the surface to disrupt the impinging droplets and form liquid aerosol particles; and
    (e) sweeping the aerosol particles away from the vibrating surface by a carrier gas stream.

2. The method for generating liquid aerosol particles according to claim 1 wherein the droplets are formed under pressure supplied by a source liquid having a static head.

3. The method for generating liquid aerosol particles according to claim 1 wherein the droplets are formed under pulse pressure conditions provided by a pulsating pump.

4. The method for generating liquid aerosol particles according to claim 1 wherein the droplets are formed in response to vibration excitation applied to a droplet delivery nozzle means.

5. The method for generating liquid aerosol particles according to claim 1 wherein the orifice has an opening parallel to the vibrating surface.

6. The method for generating liquid aerosol particles according to claim 1 wherein the droplets are formed in multiple droplet columns from a grouping of separate and distinct orifices positioned above the vibrating surface.

7. The method for generating liquid aerosol particles according to claim 1 wherein the aerosol particles are moved away from the vibrating surface by the carrier gas and are further accelerated away from the vibrating surface through electrostatic charging and of the aerosol particles immediately after the aerosol particles are formed and by providing means for accelerating the particles through electrostatic acceleration.

8. A method for generating liquid aerosol particles having a narrow-sized distribution comprising:
    forming at least one column of individual liquid droplets by forcing liquid under pressure through an orifice at a rate sufficient for forming individual droplets;
    controlling droplet formation frequency and size;
    impinging said droplets onto a surface;
    vibrating the surface to disrupt the droplets and form liquid aerosol particles and avoid substantially agglomeration of the particles;

producing aerosol particles having an average particle size of from about 1.0 to about 5.0 micrometers; and sweeping the aerosol products away from the vibrating surface by carrier gas stream.

9. An apparatus for generation of aerosol particles, comprising:
   (a) a housing means having a flash cavitation means mounted therein with the flash cavitation means having a cavitation surface exposed to an aerosol chamber;
   (b) a liquid supply apparatus for supplying droplets under release frequency control, said apparatus connected to the aerosol chamber with release means in the aerosol chamber and above the cavitation surface;
   (c) a liquid pressure means for supplying the liquid supply apparatus with liquid under pressure whereby the liquid supply apparatus generates droplets;
   (d) excitation means for receiving the droplets and being operable to vibrate the cavitation surface at a frequency whereby aerosol particles having narrow sized distribution are produced; and
   (e) gas sweep means for moving the aerosol particles away from the cavitation surface and into the aerosol chamber.

10. An apparatus for generating aerosol particles according to claim 9 wherein the liquid supply apparatus for supplying droplets under release frequency and control is pressurized by a source of liquid having a static head.

11. An apparatus for generating aerosol particles according to claim 9 wherein the liquid supply apparatus for supplying droplets under release frequency control is provided by a pulse pump for supplying pressure to the liquid supply apparatus.

12. An apparatus for generating aerosol particles according to claim 9 wherein the liquid supply apparatus for supplying droplets utilizes at least one orifice means for supplying one or more liquid droplet columns, said orifice means located above the cavitation surface.

13. An apparatus for generating aerosol particles according to claim 12 wherein the liquid supply apparatus contains a vibration excitation means for vibrating droplet delivery and orifice means.

14. An apparatus for generating aerosol particles according to claim 9 wherein the cavitation surface is located parallel to or elevated above a floor of the aerosol chamber.

15. An apparatus for generating aerosol particles according to claim 9 wherein the cavitation surface is located in a housing means cup and spaced apart from the aerosol chamber.

16. An apparatus for generating aerosol particles according to claim 9 wherein the aerosol chamber is provided with electrostatic generation means for charging the aerosol particles and electrostatic means for removing said particles from the aerosol chamber.

17. An apparatus for generating aerosol particles according to claim 9 wherein the aerosol chamber is connected to additional chambers for electrostatically separating particles according to size.

* * * * *